United States Patent
Setiabudi et al.

(10) Patent No.: US 7,442,434 B2
(45) Date of Patent: Oct. 28, 2008

(54) EPOXY RESIN COMPOSITION

(75) Inventors: Frans Setiabudi, Eschbach (DE); Ulrich Weidmann, Basel (CH); Philippe Michaud, Mulhouse (FR)

(73) Assignee: Huntsman Advanced Materials Americas Inc., The Woodlands, TX (US)

( * ) Notice: Subject to any disclaimer, the term of this patent is extended or adjusted under 35 U.S.C. 154(b) by 322 days.

(21) Appl. No.: 10/551,938

(22) PCT Filed: Apr. 5, 2004

(86) PCT No.: PCT/EP2004/050440

§ 371 (c)(1), (2), (4) Date: Oct. 4, 2005

(87) PCT Pub. No.: WO2004/049776

PCT Pub. Date: Jun. 17, 2004

(65) Prior Publication Data

US 2006/0194062 A1    Aug. 31, 2006

(30) Foreign Application Priority Data

Apr. 7, 2003  (CH)  .................................. 0625/03

(51) Int. Cl.
B32B 27/04 (2006.01)
B32B 27/26 (2006.01)
B32B 27/38 (2006.01)
C08L 63/00 (2006.01)

(52) U.S. Cl. .................... 428/297.4; 428/413; 523/400; 523/461; 525/523

(58) Field of Classification Search .............. 428/297.4, 428/413, 414, 415, 416, 417, 418, 901; 525/523; 523/400, 461
See application file for complete search history.

(56) References Cited

U.S. PATENT DOCUMENTS

| 4,129,556 A | | 12/1978 | Zondler et al. |
| 4,163,098 A | * | 7/1979 | Zondler et al. ................. 528/99 |
| 4,608,300 A | * | 8/1986 | Gruber ........................ 442/103 |
| 5,288,816 A | * | 2/1994 | Inbasekaran et al. ......... 525/502 |
| 5,739,209 A | | 4/1998 | Lasilla et al. |

FOREIGN PATENT DOCUMENTS

| EP | 0133154 A | * | 2/1985 |
| EP | 1162224 | | 12/2001 |
| JP | 04-202420 A1 | * | 7/1992 |

OTHER PUBLICATIONS

Abstract of JP 04-202420 A1; Patent Abstracts of Japan; 1992.*

* cited by examiner

*Primary Examiner*—Michael J Feely

(57) ABSTRACT

A solvent-free epoxy resin matrix composition comprising: (a) a liquid epoxy resin or a liquid mixture of epoxy resins, (b) a benzylidenamine compound, (c) an aliphatic or cycloaliphatic primary monoamine and/or disecondary diamine; and (d) a catalytically curing tertiary amine. The epoxy resin matrix composition is used as an impregnating resin to form impregnated fiber composite materials.

8 Claims, No Drawings

EPOXY RESIN COMPOSITION

CROSS REFERENCE TO RELATED APPLICATIONS

This application is the National Phase of International Application PCT/EP2004/050440 filed Apr. 5, 2004 which designated the U.S. and which claims priority to Swiss Pat. App. No. 0625/03 filed Apr. 7, 2003. The noted applications are incorporated herein by reference.

The present invention relates to a fibre composite impregnated with an epoxy resin matrix and comprising a benzylidenamine compound, to a fibre composite laminate produced from the said fibre composite, to the use of a benzylidenamine compound for improving fibre composite properties, and to an epoxy resin matrix comprising a benzylidenamine compound.

For producing storage-stable prepregs it is known to use pre-reacted epoxy resin mixtures which are still curable, i.e. B-stage resins, or pre-extended epoxy resins, in other words epoxy resins of relatively high molecular mass. Resin systems of this kind are either solid or of high viscosity, so that impregnation of fibre materials using these resins necessitates organic solvents, or they have to be applied at elevated temperature from the melt to the fibre material, or else in liquid form, with particular advantage.

From EP 133 154, for example, it is known, to produce prepregs, as resin, to use liquid epoxy resins with a curative mixture comprising certain monoamines and/or diamines and a catalytic tertiary amine.

The flexibility of the prepregs known to date, however, is frequently too low, leading for example to formation of dust during stamping. Attempts to flexibilize the prepregs by means of a flexibilizer such as benzyl alcohol, however, lead to an inadequately short prepreg stability of 1-2 days and also often to tacky surfaces. Moreover, steadily increasing requirements are being noted as regards the stability (storage at room temperature for longer than 6 days) and the processing conditions (dry surface, extended latency times).

It has now been found that, surprisingly, the properties of fibre materials impregnated with a curable, liquid, solvent-free epoxy resin or epoxy resin mixture which comprises as curative a specific amine mixture based on monoamines can be improved by the addition of a benzylidenamine compound, preferably benzylidenebenzylamine.

The present invention accordingly provides a fibre composite impregnated with a curable, solvent-free epoxy resin matrix, comprising
(a) a liquid epoxy resin or a liquid mixture of epoxy resins,
(b) a compound obtainable by reacting a benzaldehyde of the formula I

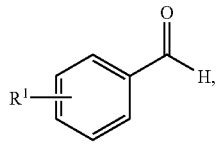

(I)

in which $R^1$ is hydrogen, hydroxyl, $C_1$-$C_5$alkyl or $C_1$-$C_5$alkoxy with a primary amine, and as curing agent a mixture composed of
(c) an aliphatic or cycloaliphatic primary monoamine and/or disecondary diamine and
(d) a catalytically curing tertiary amine, the curable epoxy resin matrix containing from 0.15 to 0.8 amine hydrogen equivalent of the amine component (c) and from 0.01 to 0.1 mol of the tertiary amine (d) per epoxide equivalent of the epoxy resin (a).

Primary amines for preparing the benzylidenamine compound of component (b) are, for example, aliphatic, cycloaliphatic or araliphatic amines.

Aliphatic amines derive for example from $C_1$-$C_{40}$alkyl radicals, such as methyl, ethyl, isopropyl, n-propyl, n-butyl, isobutyl, sec-butyl, tert-butyl, and also the various isomeric pentyl, hexyl, heptyl, octyl, nonyl, decyl, undecyl, dodecyl, tridecyl, tetradecyl, pentadecyl, hexadecyl, heptadecyl and octadecyl groups.

Cycloaliphatic amines derive for example from $C_3$-$C_{12}$cycloalkyl radicals, such as preferably $C_5$-$C_8$cycloalkyl or with particular preference $C_5$- or $C_6$cycloalkyl. Some examples are cyclopentyl, methylcyclopentyl, cyclohexyl, cycloheptyl and cyclooctyl.

Araliphatic amines derive for example from compounds containing 7 to 12 carbon atoms and with particular preference from compounds containing 7 to 10 carbon atoms. The compounds in question can be, for example, benzyl, phenethyl, 3-phenylpropyl, α-methylbenzyl, 4-phenylbutyl and α,α-dimethylbenzyl.

The aforementioned radicals can where appropriate be substituted and can also-contain a hydrocarbon chain which is interrupted by oxygen. Examples of oxygen-interrupted hydrocarbon chains are polyoxyalkylene radicals, such as polyoxyethylene or polyoxypropylene.

Specifically suitable polyamines are, for example, bis(4-aminophenyl)methane, aniline-formaldehyde resins, propane-1,3-diamine, 2,2-dimethyl-1,3-propanediamine (neopentanediamine), hexamethylenediamine, diethylenetriamine, bis(3-aminopropyl)amine, N,N-bis(3-aminopropyl)methylamine, triethylenetetramine, tetraethylenepentamine, pentaethylenehexamine, 2,2,4-trimethylhexane-1,6-diamine, m-xylylenediamine, 1,2- and 1,4-diaminocyclohexane, bis(4-aminocyclohexyl)methane, bis(4-amino-3-methyl-cyclohexyl)methane, 2,2-bis(4-aminocyclohexyl)propane and 3-aminomethyl-3,5,5-trimethylcyclohexylamine (isophoronediamine), polyaminoimidazolines and polyaminoamides, such as those formed from aliphatic polyamines and dimerized or trimerized fatty acids, for example. Further suitable amines include the polyoxyalkyleneamines from Texaco which are known as Jeffamines® such as Jeffamine® EDR148, D230, D400 or T403, for example.

Of specific preference are benzylamine and Jeffamine® D230.

The reaction of the compound (I) with primary amine takes place in a way which is known to the person skilled in the art, by the addition, for example, to the amine compound in a solvent of the compound (I) and the separation of the product obtained. The reaction takes place preferably in an equimolar ratio of the primary amino groups to the compound (I).

Preferred as component (b) are compounds of the formula II

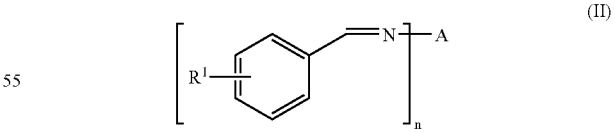

(II)

in which $R^1$ is hydrogen, hydroxyl, $C_1$-$C_5$alkyl or $C_1$-$C_5$alkoxy;
n is a number which is 1 or more; and
A is an n-valent radical derived from an aliphatic, cycloaliphatic or araliphatic compound having at least n primary amino groups.

Preferably A is an n-valent $C_1$-$C_{40}$alkyl radical, which optionally can be interrupted by oxygen, or is a $C_3$-$C_8$cycloalkyl or $C_7$-$C_{10}$aralkyl radical.

Preferably n is one of the numbers 1 to 10 and with particular preference it is 1 or 2.

In the curable epoxy resin matrix suitable for impregnation there is preferably from 0.3 to 20% by weight, more preferably from 0.3 to 8% by weight, based on components (a), (c) and (d), of component (b), preferably benzylidenebenzylamine. Also advantageous are amounts of component (b) of greater than 1.5% and in particular greater than 4% by weight.

In the curable epoxy resin matrix suitable for impregnation there is preferably from 0.2 to 0.7 amine hydrogen equivalent of the amine component (c) and from 0.02 to 0.06 mol of the tertiary amine (d) per epoxide equivalent.

In one preferred embodiment the fibre composite is impregnated with an epoxy resin matrix, with component (c) being a primary monoamine.

Examples of suitable components (a) include the liquid epoxy resins based on bisphenol A or F or based on phenol novolaks or mixtures thereof in any proportion. They can be mixed with a reactive diluent, such as phenyl or cresyl glycidyl ether, butanediol diglycidyl ether or diglycidyl hexahydrophthalate, for example, preferably in an amount of 3-50% by weight, based on the total amount of the epoxy resins, or with diglycidylaniline, preferably in an amount 3-20% by weight, based on the total amount of the epoxy resins. Further suitable mixtures of epoxy resins include triglycidyl-p-aminophenol and tetraglycidyl-p,p'-diaminodiphenylmethane, which may be in the form of a mixture with butanediol diglycide or diglycidylaniline.

The stated epoxide compounds can also be used in any desired mixtures with one another or with solid epoxy resins which are soluble in the epoxy resin mixture, provided that the viscosity of the end mixture at room temperature is less than 12 000 mPa.s, preferably less than 6000 mPa.s, more preferably less than 1500 mPa.s, the viscosity determination being carried out in accordance with Brookfield using spindle 3 at 50 rpm and at 25° C.

Examples of compounds suitable as primary monoamine (c) include benzylamine, cyclo-hexylamine, ethanolamine, 2-ethylhexylamine, 2-phenylethylamine, 3-(2-ethylhexoxy) propylamine, n-octylamine, 2-butoxyethylamine, 2-(2-hydroxyethoxy)ethyl-1-amine, 3-isopropoxypropyl-1-amine or 3-amino-2,2-dimethylpropan-1-ol.

Examples of suitable disecondary diamines (c) include piperazine, N,N'-dicyclohexylhexamethylene-1,6-diamine and N,N'-bis(β-cyanoethyl)hexamethylene-1,6-diamine.

The aforementioned primary monoamines and disecondary diamines are known compounds and are largely available commercially.

The tertiary amines (d) which are used as catalytic curing agents are likewise known curing agents for epoxy resins, and some of them are available commercially. In addition to the compounds specified there it is also possible to use the compounds disclosed in EP 018 949 or the known imidazole compounds of the formulae

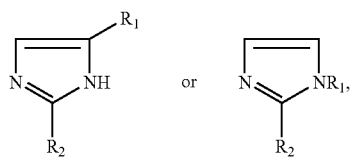

in which $R_1$ and $R_2$ independently of one another are each a hydrogen atom, methyl, ethyl or phenyl. The imidazole compounds of the specified formulae are preferred catalytic curing agents.

As reinforcing fibres for the fibre composite of the invention it is possible to use the customary fibres which are used for fibre reinforcement of materials. These can be organic or inorganic fibres, natural fibres or synthetic fibres, and may be present in the form of wovens or non-crimp fabrics, non-woven webs or mats, and also in the form of fibre strands (rovings), or as staple fibre or continuous fibre. As reinforcing fibres use is made, for example, of glass, boron, carbon or metal fibres and also aramide fibres, high-strength polyester fibres or natural fibres from cotton or spun rayon. Such fibres and wovens made from them are available commercially.

These fibres or wovens can be coated with the solvent-free epoxy resin mixture by the standard impregnating methods, by brushing, spraying, or dipping, by means of extrusion or, in the case of continuous fibres, by the precision filament winding method.

The fibre materials coated with the matrix resin can be dried in air at room temperature, in which case the matrix resin is gradually converted to the still-meltable or -curable B stage and what are known as prepregs are obtained. Since the matrix resin used for impregnating is solvent-free, there is no need, moreover, for the process step of removing the solvent without residue from the fibre composite prior to final curing, which is necessary in order that no pores or holes are formed in the cured composite as a result of the evaporation of residual solvent.

The production of prepregs from the fibre composite of the invention is therefore also associated with the advantage that neither for the evaporation of the solvent nor for the pre-extension of the resin is there any need for the corresponding process steps, and that there is no heat energy expense required.

The fibre composite of the invention is preferably in the form of prepregs, which can be used to produce laminates in conventional fashion.

The prepregs of the invention can be cured to completely at temperatures below 120° C. and are therefore advantageously suitable for producing fibre composite systems with other materials, particularly those which do not withstand temperatures above 120° C. well, such as wood or plastics with a low softening point, such as ABS polymers, polyethylene or PVC, for example.

The present invention accordingly further provides a fibre composite system, in particular a fibre composite laminate, which is obtained from the fibre composition of the invention together where appropriate with other materials, with shaping and crosslinking of the resin matrix.

The present invention additionally provides for the use of benzylidenebenzylamine for improving the properties of a fibre composite comprising an epoxy resin and as curing agent a mixture composed of an aliphatic or cycloaliphatic primary monoamine and/or disecondary diamine and a catalytically curing tertiary amine.

Preference is given to the use of benzylidenebenzylamine for improving the flexibility of prepregs and/or the processing time of the laminate (increasing the latency time). The preferred use of benzylidenebenzylamine corresponds to the preferences described earlier on above for the fibre composite comprising epoxy resin. Particular advantage for improving the flexibility of prepregs is given to the use of 4-8% by weight of benzylidenebenzylamine.

The present invention further provides an epoxy resin matrix comprising a liquid epoxy resin or a liquid mixture of epoxy resins, benzylidenebenzylamine and as curing agent a mixture composed of an aliphatic or cycloaliphatic primary monoamine and/or disecondary diamine and a catalytically curing tertiary amine.

A preferred epoxy resin matrix corresponds to the preferences described earlier on above for the fibre composite comprising epoxy resin.

Preparation Examples for Benzylidene Compounds

A1:

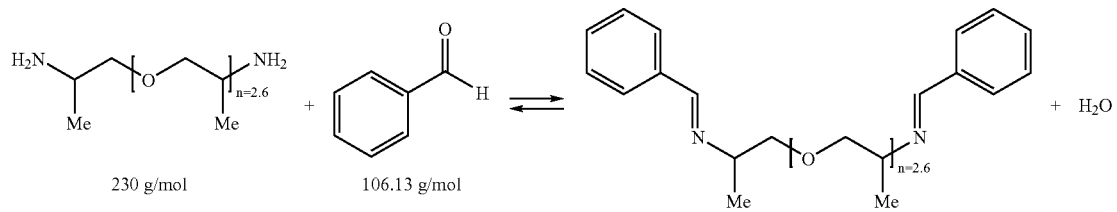

A 750 ml sulphonating flask provided with stirrer, internal thermometer, dropping funnel and reflux condenser is charged with 50 g (0.217 mol) of Jeffamine® D 230, and 200 ml of ethanol are added with stirring. After this solution has been stirred for 30 minutes 40.3 g (0.379 mol) of benzaldehyde are added over the course of 15-20 minutes at an internal temperature of 23-24° C. This reaction mixture is heated to boiling under reflux at an internal temperature of 75-78° C. over the course of 15 minutes. After 2.5 hours under reflux (internal temperature: 78° C.) the yellow solution is cooled to room temperature. 50 to 100 g of anhydrous sodium sulphate are added to this solution at room temperature and the mixture is stirred at room temperature for one hour more. Following the removal of the sodium sulphate by filtration the major fraction of the solvent is removed by means of a rotary evaporator. Residual ethanol is removed under reduced pressure at 45° C. and a pressure of 3 mBar in the course of three hours. 83.3 g of a brownish oil are isolated.

$^1$H-NMR: (CDCl$_3$)

δ=0.92 ppm (m); 1.1 ppm (m); 3-3.8 ppm (m); 7.42 ppm (s); 7.72 ppm (m) Integral ratio: 7.16:9.8:3.2:2:1

IR (Pure):

3060.19 cm$^{-1}$, 2966.99 cm$^{-1}$ (intense); 2924.27 cm$^{-1}$(intense), 2862.14 cm$^{-1}$(intense); 1700.97 cm$^{-1}$(traces), 1646.60 cm$^{-1}$ (intense), 1576.70 cm$^{-1}$, 1444.66 cm$^{-1}$, 1374.76 cm$^{-1}$, 1106.80 cm$^{-1}$ (intense, broad), 753.40 cm$^{-1}$, 691.26 cm$^{-1}$ A 750 ml sulphonating flask provided with stirrer, internal thermometer, dropping funnel and reflux condenser is charged with 50 g (0.217 mol) of Jeffamine® D 230, and 200 ml of ethanol are added with stirring. After this solution has been stirred for 30 minutes 46.4 g (0.38 mol) of salicylbenzaldehyde are added over the course of 15-20 minutes at an internal temperature of 22° C., whereupon an internal temperature of 34° C. is established. After a further 30 minutes of stirring the temperature dropped to 26° C. The dark-yellow reaction solution thus obtained is heated to 77° C. to 78° C. over the course of 20 minutes, so that reflux comes about. The progress of the reaction is monitored by means of thin-layer chromatography (mobile phase: toluene, silica gel on glass, Merck, developer: potassium permanganate solution). After four hours there is no further change in the pattern, and this is taken to be complete conversion. After it has cooled to room temperature, this reaction solution is admixed with about 50-100 g of anhydrous sodium sulphate and stirred for one hour thereafter. After the drying agent has been filtered off the major fraction of the solvent is removed by means of a rotary evaporator. Some residues are removed under a high vacuum (45° C./3 mBar, 3 hours). 89.7 g of a yellow oil are isolated.

| TLC: | |
|---|---|
| Salicylbenzaldehyde | r$_f$: 0.42; |
| Jeffamine D 230: | r$_{f1}$: 0.07; r$_{f2}$: 0.14; r$_{f3}$: 0.22 |
| Isolated product: | r$_{f1}$: 0.1, r$_{f2}$: 0.28 |

$^1$H-NMR: (CDCl$_3$)

δ=0.96 ppm (m,4); 1.22 ppm (m, 3.7); 3.48 ppm (m, 7.3); 6.76 ppm (m, 3.2); 6.9 ppm (m, 1), 7.23 ppm (CDCl$_3$); 8.3 ppm (m,1.25); 8.3 ppm (s, traces)

Integral ratios of the signals between d=0 and 15 ppm): 4:4:7.3:3.2:1:1.1:1.25

A2:

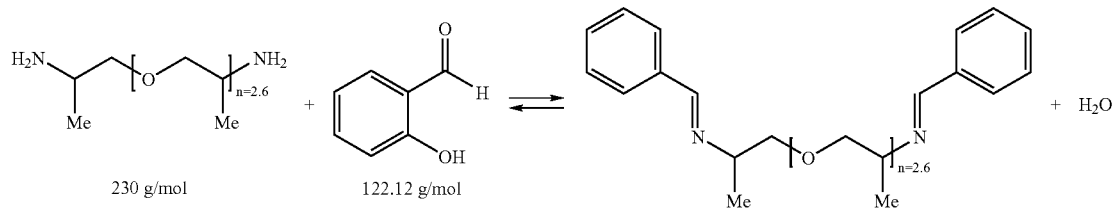

IR (Pure)

3500-3100 cm$^{-1}$(broad), 3056.3 cm$^{-1}$(weak), 2966.99 cm$^{-1}$ (intense), 2928.16 cm$^{-1}$ (intense); 2858.25 cm$^{-1}$ (intense), 2788 cm$^{-1}$ (weak), 2733.98 cm$^{-1}$ (weak), 2664.08 cm$^{-1}$ (weak), 1634 cm$^{-1}$ (intense), 1580.58 cm$^{-1}$ (moderate), 1495.15 cm$^{-1}$, 1456.31 cm$^{-1}$, 1413.59 cm$^{-1}$, 1378.64 cm$^{-1}$, 1330 cm$^{-1}$, 1277.67 cm$^{-1}$, 1207.77 cm$^{-1}$, 1145.63 cm$^{-1}$, 1114.56 cm$^{-1}$, 1025.24 cm$^{-1}$, 978.64 cm$^{-1}$, 932.04 cm$^{-1}$, 904.85 cm$^{-1}$, 846.60 cm$^{-1}$, 753.40 cm$^{-1}$, 737.86 cm$^{-1}$

EXAMPLE 1

100 g of an epoxy resin based on bisphenol A, having an epoxide content of 5.3 equivalents/kg, and 5.9 g of benzylidenebenzylamine are admixed with an amine mixture made up of 15 g of benzylamine (0.53 N—H equivalent/ epoxide equivalent) and 3 g of 2,4,6-tris(dimethylaminomethyl)phenol (0.021 mol/epoxide equivalent) and the components are mixed with one another until the mixture is free of streaks. This resin mixture is used to impregnate sections of glass woven (Interglasgewebe 92146 from Interglas-Textil GmbH/DE) (resin content 30-35% by weight). After one day the sections of glass woven have a dry surface, are very flexible, and exhibit a resin flow of about 13% after 6 days of storage at 20-25° C. The prepregs can be stamped without forming dust and the Tg after 20 minutes' curing at 110° C. is 63° C.

The resin flow determination is carried out as follows:

2 square pieces of prepreg with an edge length of 5 cm, for example, are weighed (=G1), laid precisely on top of one another, then inserted between 2 release papers or sheets into a press preheated to 100° C. This press is immediately closed to a pressure of 2 MPa. After 5 minutes the resulting laminate is removed from the hot press and the resin which is flowed out along the edge of the laminate is cut off. The laminate is weighed again (=G2). The difference in weight between G1 and G2, expressed in %, gives the "flow".

COMPARATIVE EXAMPLE

Prepregs are produced in analogy to Example 1 but without the addition of benzylidenebenzylamine. After one day of storage at 20-25° C. such prepregs are very brittle and form large amounts of dust during stamping.

EXAMPLE 2

The viscosity of epoxy resin mixtures as per the table below is measured.

|  | 0% | 0.3% | 1.5% | 4.8% |
|---|---|---|---|---|
| A) |  |  |  |  |
| Epoxy resin (5.3 eq/kg) | 100 | 100 | 100 | 100 |
| Benzylamine | 15 | 15 | 15 | 15 |
| 2,4,6-Tris(dimethylaminomethyl)-phenol | 3 | 3 | 3 | 3 |
| Benzylidenebenzylamine |  | 0.354 | 1.77 | 5.9 |
| Viscosity at 60° C. after 30 minutes | 7160 | 3470 | 2820 | 1310 |
| B) |  |  |  |  |
| Epoxy resin (5.3 eq/kg) |  | 100 | 100 | 100 |
| Benzylamine |  | 15 | 15 | 15 |
| 2,4,6-Tris(dimethylaminomethyl)-phenol |  | 3 | 3 | 3 |
| Compound A1 |  | 0.354 | 1.77 | 5.9 |
| Viscosity at 60° C. after 30 minutes |  | 2430 | 2250 | 1050 |
| C) |  |  |  |  |
| Epoxy resin (5.3 eq/kg) |  | 100 | 100 | 100 |
| Benzylamine |  | 15 | 15 | 15 |
| 2,4,6-Tris(dimethylaminomethyl)-phenol |  | 3 | 3 | 3 |
| Compound A2 |  | 0.354 | 1.77 | 5.9 |
| Viscosity at 60° C. after 30 minutes |  | 2900 | 2430 | 1400 |

The addition of benzylidenebenzylamine or a benzylidenamine compound according to Example A1 and A2 leads to a marked retardation of the increase in viscosity as compared with the samples which do not contain the stated compounds.

The invention claimed is:

1. A fibre composite impregnated with a curable, solvent-free epoxy resin matrix composition, said composition comprising:
   (a) a liquid epoxy resin or a liquid mixture of epoxy resins,
   (b) a benzylidenamine compound obtained by reacting a benzaldehyde of the formula (I)

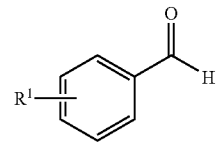

in which R$^1$ is hydrogen, C$_1$-C$_5$ alkyl or C$_1$-C$_5$ alkoxy, with a primary amine,
   (c) an aliphatic or cycloaliphatic primary monoamine and/or disecondary diamine, and
   (d) a catalytically curing tertiary amine,
the curable epoxy resin matrix composition containing from 0.15 to 0.8 amine hydrogen equivalent of the amine component (c) and from 0.01 to 0.1 mol of the tertiary amine (d) per epoxide equivalent of the epoxy resin (a).

2. The fibre composite according to claim 1, containing from 0.3 to 20% by weight, based on components (a), (c) and (d), of the benzylidenamine compound.

3. The fibre composite according to claim 1, containing from 0.2 to 0.7 amine hydrogen equivalent of the amine component (c) and from 0.02 to 0.06 mol of the tertiary amine (d) per epoxide equivalent.

4. The fibre composite according to claim 1, wherein component (c) is an aliphatic or cycloaliphatic primary monoamine.

5. The fibre composite according to claim 1, wherein the benzylidenamine compound is benzylidenebenzylamine.

6. A fibre composite system, produced from the fibre composite according to claim 1 together with wood or plastics having a low softening point.

7. A solvent-free epoxy resin matrix composition comprising:

(a) a liquid epoxy resin or a liquid mixture of epoxy resins,
(b) a benzylidenamine compound obtained by reacting a benzaldehyde of the formula (I)

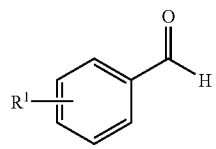

in which $R^1$ is hydrogen, $C_1$-$C_5$ alkyl or $C_1$-$C_5$ alkoxy with a primary amine,
(c) an aliphatic or cycloaliphatic primary monoamine and/or disecondary diamine, and
(d) a catalytically curing tertiary amine.
the curable epoxy resin matrix composition containing from 0.15 to 0.8 amine hydrogen equivalent of the amine component (c) and from 0.01 to 0.1 mol of the tertiary amine (d) per epoxide equivalent of the epoxy resin (a).

8. The epoxy resin matrix according to claim 7, containing, based on the total amount of epoxy resin and curing agent, from 0.3 to 20% by weight of the benzylidenamine compound obtained by reacting a benzaldehyde of the formula (I)

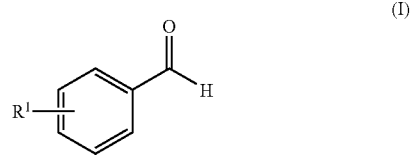

in which $R^1$ is hydrogen, $C_1$-$C_5$ alkyl or $C_1$-$C_5$ alkoxy with a primary amine.

* * * * *